(12) United States Patent
Buendgen et al.

(10) Patent No.: US 12,468,859 B2
(45) Date of Patent: Nov. 11, 2025

(54) SELECTING AN HSM FOR ASSOCIATION TO A SECURE GUEST

(71) Applicant: INTERNATIONAL BUSINESS MACHINES CORPORATION, Armonk, NY (US)

(72) Inventors: Reinhard Theodor Buendgen, Tuebingen (DE); Viktor Mihajlovski, Wildberg (DE); Jonathan D. Bradbury, Poughkeepsie, NY (US); Harald Freudenberger, Fellbach (DE); Steffen Eiden, Böblingen (DE); Volker Urban, Böblingen (DE); Eric David Rossman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 18/159,376

(22) Filed: Jan. 25, 2023

(65) Prior Publication Data
US 2024/0176913 A1    May 30, 2024

(30) Foreign Application Priority Data

Nov. 29, 2022 (GB) .................................... 2217880

(51) Int. Cl.
*G06F 21/72* (2013.01)
(52) U.S. Cl.
CPC .................... *G06F 21/72* (2013.01)
(58) Field of Classification Search
CPC ................. G06F 21/72; G06F 21/57
See application file for complete search history.

(56) References Cited

U.S. PATENT DOCUMENTS 10,353,722 B2 *  7/2019 Karino ................. G06F 9/45558
10,855,660 B1 * 12/2020 Gernhardt ........... H04L 63/0435
(Continued)

FOREIGN PATENT DOCUMENTS

CN        105893853 A       8/2016
CN        114930328 A       8/2022
(Continued)

OTHER PUBLICATIONS

Taiwan Patent Office, "Office Action," Sep. 2, 2024, 16 Pages, TW Application No. 112127460.
(Continued)

*Primary Examiner* — Sm A Rahman
(74) *Attorney, Agent, or Firm* — Kristofer Haggerty

(57) ABSTRACT

A method for a policy-based association of a hardware security module to a secure guest is disclosed. The method comprises maintaining a binding between a secure guest and an HSM. Thereby, the binding enables the trusted guest to send only non-sensitive request to the HSM. The method comprises further maintaining, for a secure guest, a pair of a secret and a secret name, submitting a query to the bound HSM for obtaining HSM configuration data, and upon determining that the obtained HSM configuration data match a rule available to the secure guest, wherein the rule associates the HSM to a secret name, requesting to associate the secret from the pair of secret and the secret name to the bound HSM, thereby triggering that the trusted firmware allows the secure guest to submit a sensitive crypto-request to the bound and associated HSM.

25 Claims, 8 Drawing Sheets

(56) References Cited

U.S. PATENT DOCUMENTS

| | | |
|---|---|---|
| 11,023,589 B2 * | 6/2021 | Liguori .................. H04L 9/006 |
| 11,516,186 B1 * | 11/2022 | Ambaliya .......... H04L 63/0428 |
| 2009/0165117 A1 | 6/2009 | Brutch |
| 2016/0239667 A1 | 8/2016 | Boenisch et al. |
| 2017/0310652 A1 | 10/2017 | Campagna |
| 2018/0212939 A1 | 7/2018 | Costa |
| 2020/0076607 A1 | 3/2020 | Allen |
| 2020/0167085 A1 | 5/2020 | Werner |
| 2020/0285746 A1 | 9/2020 | Buendgen |
| 2021/0232709 A1 | 7/2021 | Buendgen |
| 2021/0234681 A1 | 7/2021 | Buendgen |
| 2022/0180000 A1 | 6/2022 | Sofia et al. |

FOREIGN PATENT DOCUMENTS

| | | |
|---|---|---|
| GB | 2624867 A | 6/2024 |
| TW | 202038114 A | 10/2020 |
| TW | 202435107 A | 9/2024 |
| WO | 2024/115147 A1 | 6/2024 |

OTHER PUBLICATIONS

International Searching Authority, "International Search Report and Written Opinion of the International Searching Authority", International Application No. PCT/EP2023/082277, Mailed Feb. 12, 2024, 11 pages.

Buendgen et al., "Selecting an Hsm for Association to a Secure Guest", International Application No. PCT/EP2023/082277, International Filing Date Nov. 17, 2023, 41 pages, claims priority on U.S. Appl. No. 18/159,376 (present application).

UK Intellectual Property Office, "Search Report", May 23, 2023, 3 pages GB Application No. 2217880.0.

* cited by examiner

SELECTING AN HSM FOR ASSOCIATION TO A SECURE GUEST

BACKGROUND

Field of the Invention

The invention relates generally to a method for a policy-based confidential computing environment, and more specifically, to computer-implemented method for a policy-based association of a hardware security module to a secure guest in a confidential computing environment. The invention relates further to a related security system for a policy-based association of a hardware security module to a secure guest in a confidential computing environment, and a computer program product.

Related Art

The security of data and communication channels still continues to have one of the highest priorities for the management of corporate IT (information technology). This is not only necessary due to government regulations (e.g., GDPR, EU General Data Protection Regulation), but also because of the loss of credibility with companies that cannot reliably protect customer data at all times—and in order to avoiding loss of sales and profits—in the event of compromised customer data records. Additionally, fines may have to be paid depending on the country of the data breach. It turns out that data protection and the provision of secure computing platforms is not just a software issue, it also involves hardware modules. This may not yet be a natural environment for mass-market CPU-chips used in microcontrollers, personal computers, mobile phones or home automation devices. However, for highly trusted enterprise-class computing environments, such as those used in the financial, insurance, or government industries, it is essential to be able to demonstrate that, from a technological perspective, data breaches have a very high probability of being prevented. This may require some additional high-tech components and supporting processes. However, the associated success in terms of data security pays off for the additional effort.

These thoughts are also applicable to trusted and/or confidential computing environments in which cryptographic keys used by virtual machines (also denoted as guests) or software containers running on/in hypervisors can practically not be accessed by the hypervisor or related software management and configuration programs. Nevertheless, also in such computing environments breaches of the fundamental security rules, such as an exposure of a secret key or usage of a secret key for a secure guest image through the hypervisor, continue to be possible. This may also be possible in environments in which hardware security modules (HSMs) have been in use for quite some time.

There are already some disclosures that fit in the context of for a policy-based association of a hardware security module to a secure guest in a confidential computing environment. Document US 2020/0 076 607 A1 describes how a secret is securely maintained on a virtual computer system by configuring a specialized virtual machine to manage and maintain the sequent on behalf of an application. When the application requests access to the secret, a controlling domain, in combination with the specialized virtual machine, validates that the application is authorized to make the request and that the application was not compromised prior to the request.

Additionally, document US 2017/0 310 652 A1 describes that a system can transmit data to a first entity to indicate an association between the first entity and a public key. Thereby, the public key is to be used to establish a cryptographically protected communications session between the first entity and a second entity, receive the data in response to a request to verify the association, and transmit an indication that the data is valid to the second entity. The system can be a cryptography service that is partially implemented by the first and second entities.

Problems in such environments can be identified in the context of using an additional key as part of the metadata of a virtual guest system under control of a hypervisor. However, if the additional key was provided by the virtual guest system it would be known to the virtual guest system where it could also be stolen like other credentials. Technologies such as openCryptoki or CCA (Common Cryptographic Architecture) cannot yet elegantly meet this requirement.

Hence, there is a need to provide a secure binding method between a virtual machine and a hardware security module such that the virtual machine has no concrete knowledge about the underlying configuration enabling such binding.

SUMMARY OF THE INVENTION

According to one aspect of the present invention, a computer-implemented method for a policy-based association of a hardware security module (HSM) with a secure guest in a confidential computing environment may be provided. The method may comprise maintaining, by a trusted firmware, a binding between a secure guest and an HSM. Thereby, the binding may enable the secure guest to send only non-sensitive request to the HSM.

The method may also comprise maintaining, by a trusted firmware, for a secure guest, a pair of a secret and a secret name and submitting, by the secure guest via the trusted firmware, a query to the bound HSM for obtaining HSM configuration data.

Additionally, and upon determining, by the secure guest, that the obtained HSM configuration data match a policy rule available to the secure guest, the method may comprise requesting by the secure guest from the trusted firmware, to associate the secret from the pair of secret and the secret name to the bound HSM. Thereby, the policy rule may associate the HSM configuration data with a secret name. As a result, the trusted firmware may allow the secure guest to submit a sensitive crypto-request to the bound and associated HSM.

According to another aspect of the present invention, a security system for a policy-based association of a hardware security module to a secure guest in a confidential computing environment may be provided. The system may comprise a processor and a memory operationally coupled to the processor, where the memory stores software program code, which, when executed by the processor, enables the processor to maintain, using a trusted firmware, a binding between a secure guest and an HSM, wherein the binding enables the trusted guest to send only non-sensitive requests to the HSM and to maintain, using a trusted firmware, for a secure guest, a pair of a secret and a secret name.

The processor may also be enabled to submit, by the secure guest via the trusted firmware, a query to the bound HSM or obtaining HSM configuration data, upon determining, by the secure guest, that the obtained HSM configuration data match a policy rule available to the secure guest, the processor may be enabled to request, using the secure guest from the trusted firmware, to associate the secret from the pair of secret and the secret name to the bound HSM. Thereby, the policy rule may associate the HSM configuration data to a secret name.

As a result, the trusted firmware may allow the secure guest to submit a sensitive crypto-request to the bound and associated HSM.

The proposed computer-implemented method for a policy-based association of a hardware security module to a secure guest in a confidential computing environment may offer multiple advantages, technical effects, contributions and/or improvements:

The linkage established between a secure guest and an HSM may basically be performed in a two-step process by (a) establishing a binding between the secure guest and the HSM and (b) establishing an association between the same secure guest in the same HSM. Thereby, the binding may only allow non-sensitive requests to the HSM, such that neither the request nor the response may get corrupted or accessible by the component that is not trusted. Thereby, the additional association may allow sensitive requests from the secure guest to the HSM. This may allow to protect the confidential computing environment in three ways: (i) against an exposure of the HSM protected secret (e.g., a security key), (ii) against the usage of an HSM protected secret by a wrong guest image and, (iii) a use of an HSM protected secret by a wrong guest instance. In the same way, the secret used to establish this protection may be protected against an exposure, usage by a wrong guest image or, guest instance. Thereby, the secret of the pair of the secret and the secret name may never be visible to the secure guest on the hypervisor and, thus, cannot be stolen from the secure guest. Only the trusted firmware may fully access these highly sensitive data.

Furthermore, the policy based association may allow the secure guest select a specific HSM among multiple HSMs assigned to the secure guest to assign a secret meant to protect HSM protected keys for a specific workload/application which supposed to use the specific HSM.

Moreover, the policy based association may allow the secure guest to deny a usage of an HSM of which the configuration is not included in the policy, thereby, avoiding the danger of using an HSM belonging to an attacker.

Additionally, the optional but enabled feature to unbind and de-associate an HSM that gets de-assigned from a secure guest will result in presenting a binding error when using an HSM that was temporarily de-assigned (and then reassigned), allowing the guest to recognize the temporary re-assignment and to re-evaluate the validity of the HSM making sure the HSM was not exchanged or reconfigured during the period of being de-assigned.

In the following, additional embodiments of the inventive concept—applicable for the method as well as for the system—will be described.

According to an advantageous embodiment, the method may also comprise intercepting, by the trusted firmware, each request from the secure guest to an HSM for generating an HSM-protected key, and enforcing, by the trusted firmware that the generated HSM-protected key is only to be used with the HSM associated with the secret from the secure guest. I.e., it is not enough that the HSM is bound to the secure guest to ensure a secure communication channel between the secure guest and the HSM or vice versa, but also that additionally an association between the secure guest and the HSM has been established to make HSM protected keys exclusively usable by a secure guest. With other words, the two-step process—firstly a binding and secondly an association—must have been executed before sensitive crypto-requests may be executed by the HSM on request of the secure guest. For this, the intercepting of each request from the secure guest to the HSM by the trusted firmware may be instrumental to render HSM protected keys usable by secure guests configured with a specific (association) secret.

According to a permissive embodiment of the method, the HSM master key verification pattern (MKVP) may be indicative of the configuration data of the HSM. I.e., all setting and configuration data as well as capabilities of a specific HSM may be codified and thus interpretable by the requesting secure guest in the master key verification pattern. With this, the secure guest may be enabled to use the master key verification pattern for a comparison against policy-based rules to select an appropriate HSM for its requirements.

According to another advantageous embodiment of the method, the pair of the secret and the secret name may be added to the metadata which the trusted firmware may maintain for the secure guest. Thereby, such metadata may be maintained by the trusted firmware for each secure guest instance separately.

According to a preferred embodiment, the method may also comprise requesting, by the secure guest to the trusted firmware, a list of secret names of the pairs of secrets and secret names maintained by the trusted firmware for the secure guest. This may be implemented by a call-interface or API (application programming interface) for the secure guest to the trusted firmware.

According to an advanced embodiment, the method may also comprise submitting, by the secure guest via the trusted firmware, a new query to another HSM for obtaining other configuration data if the obtained configuration data of the HSM do not match the policy rule. This way, the secure guest may identify the HSM compliant with the policy-based rule for a selection of an appropriate HSM for the secure guest. I.e., a step-and-repeat process may be established in order to identify a fitting HSM for the requirements of a secure guest.

According to a useful and security enhancing embodiment, the method may also comprise—upon a change of an assignment configuration of the HSM bound to a secure guest—dissolving the binding of the HSM to the secure guest, and also dissolving the association of the HSM with any secret if such an association exists. With this, the ability to use the HSM by the secure guest may be rendered impossible. I.e., a reset of the binding and association between the secure guest and the HSM may be established. In other words, every bound HSM should be unbound if its assignment changes, i.e., if the HSM is associated to a secret, this association must also "unassociated". And, this must happen automatically and in an atomic manner, i.e., HSM for HSM and, secure guest for secure guest in order to be compliant with the rules of the confidential computing environment.

According to a further interesting embodiment of the method, the trusted firmware may deny all requests—in particular sensitive requests—from a secure guest to an HSM that is not bound to the secure guest. Consequently, firstly a binding may have to be established before an association may happen before sensitive requests may be addressed from the secure guest to the HSM.

According to another interesting embodiment of the method, the binding between the secure guest and the HSM may be established by the trusted firmware upon a request from the secure guest to the trusted firmware to bind the HSM if the HSM is assigned to the secure guest. It may be noted that such process may only be possible for those HSMs that are visible to the secure guest. This may also be applied to the assignment configuration.

According to a security enhancing embodiment of the method, a plaintext value of the secret shall be inaccessible by the secure guest. I.e., the secret maintained by the trusted firmware can also not be stolen from the secure guest because it never has access to it.

According to a further useful embodiment of the method, any request to the HSM bound to the secure guest may only be allowed if issued by the secure guest or the trusted firmware on behalf of the secure guest. Hence, no other secure guest or any other entity may be allowed to access the related HSM by any side tracks. Hence, the governing rules of confidential computing may always be applied.

According to an additional embodiment of the method, any request from a secure guest to the HSM that may comprise an HSM protected key, or whose response—in particular, to the request—comprises an HSM protected key may be a sensitive request. Such classification may ensure that the clear differentiation between a non-sensitive and a sensitive request may always be guaranteed in order to comply with confidential computing rules.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject—matter, also any combination between features relating to different subject—matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
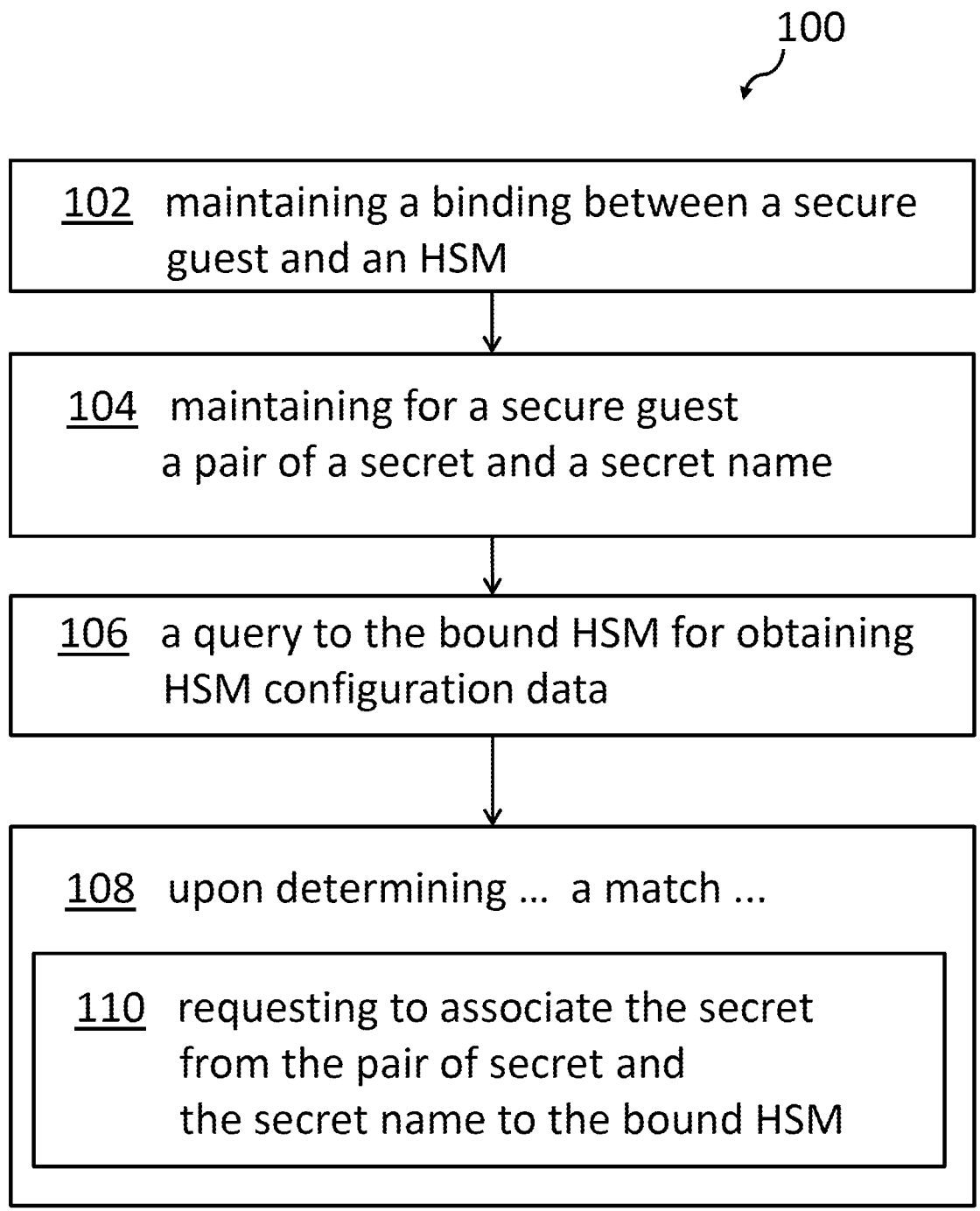

Preferred embodiments of the invention will be described, by way of example only, and with reference to the following drawings:

FIG. 1 shows a flowchart of an embodiment of the inventive computer-implemented method for a policy-based association of a hardware security module to a secure guest in a confidential computing environment.

Figure 2:
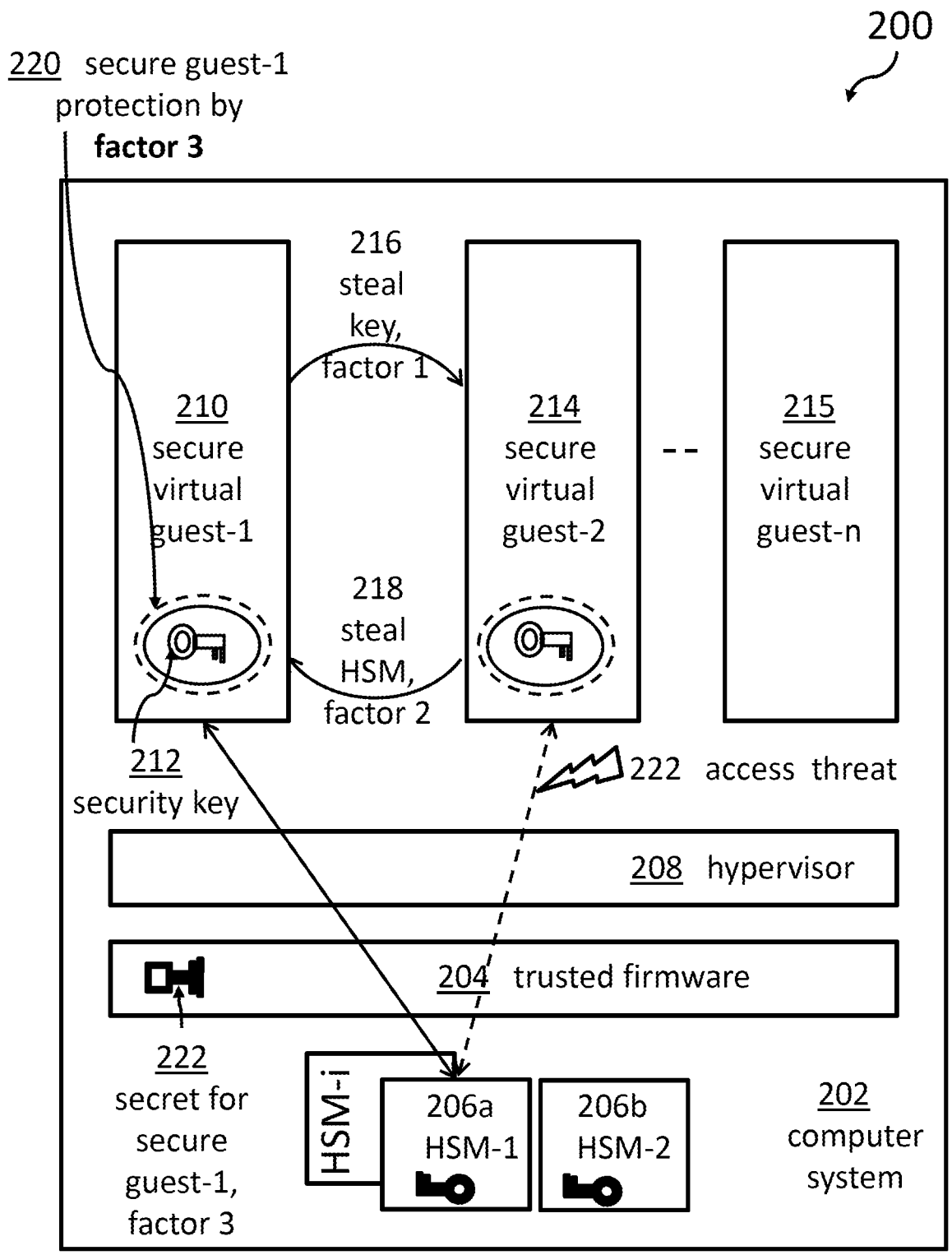

FIG. 2 shows a block diagram of an embodiment 200 of the thread potential with multi-factor authentication.

Figure 3:
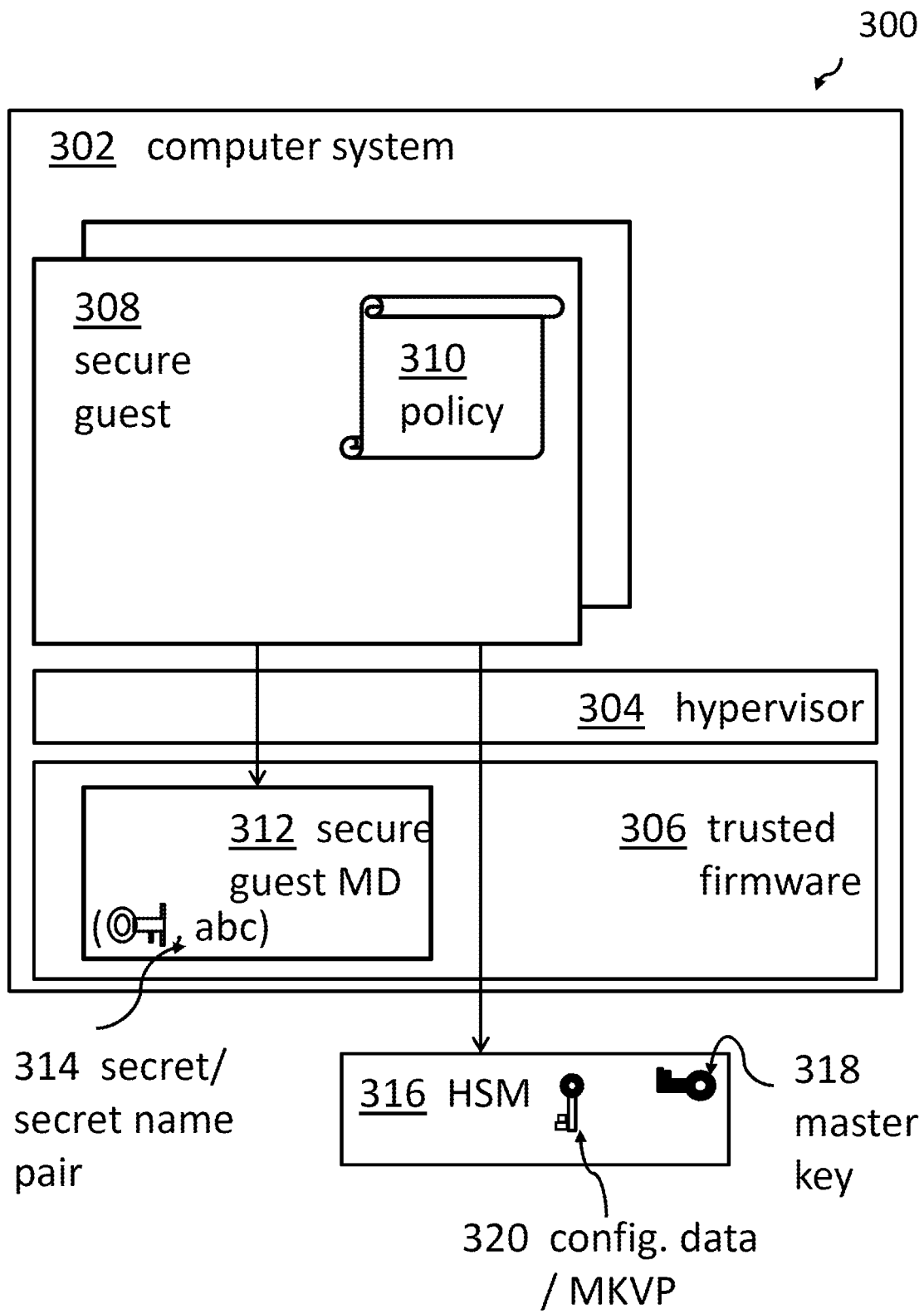

FIG. 3 shows a block diagram of an embodiment 300 of more practical details of the proposed method, in particular involved components.

Figure 4:
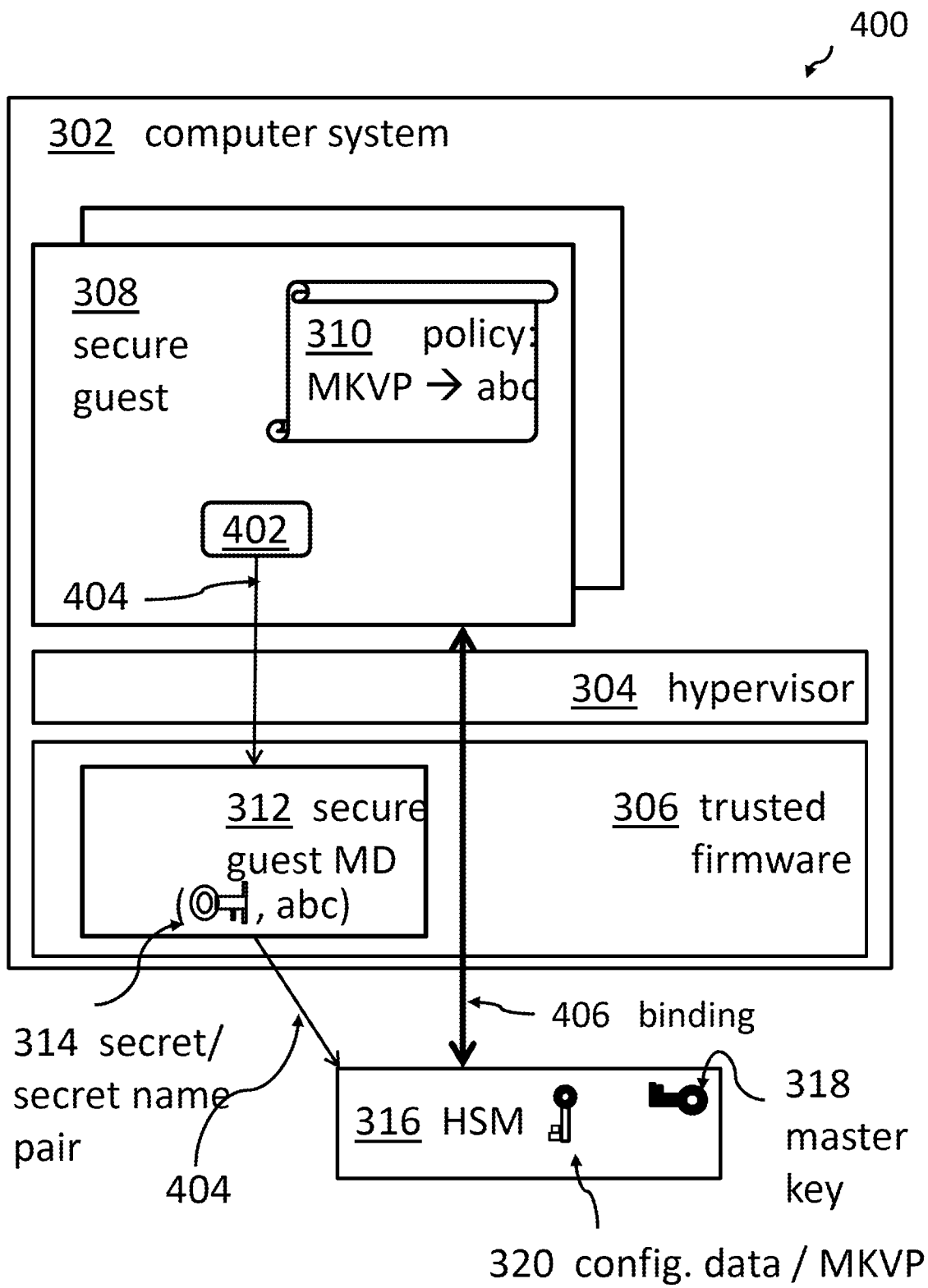

FIG. 4 shows a block diagram of a first step of the association of the HSM to the secure guest.

Figure 5:
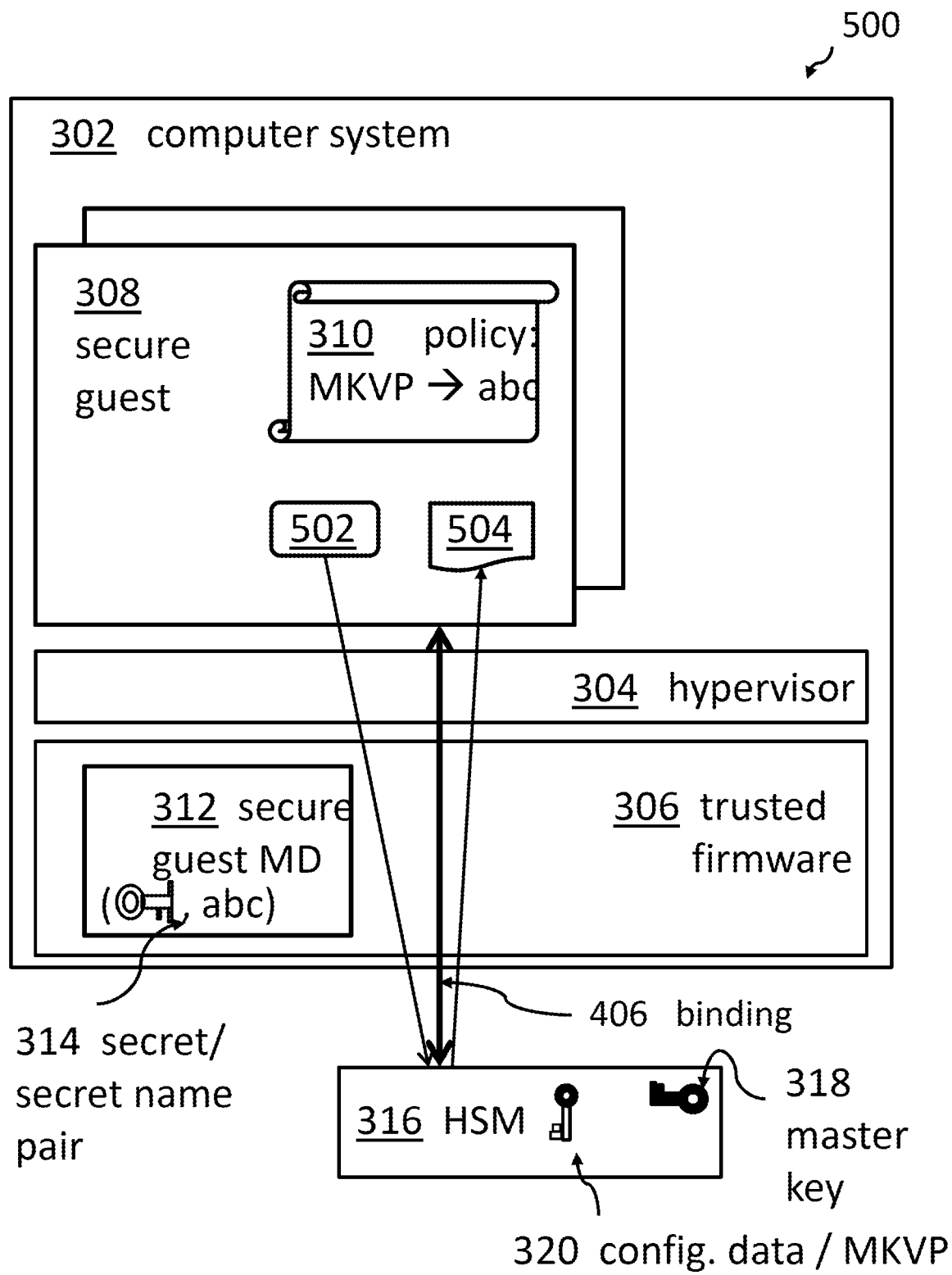

FIG. 5 shows a block diagram of a second step of the association of the HSM to the secure guest.

Figure 6:
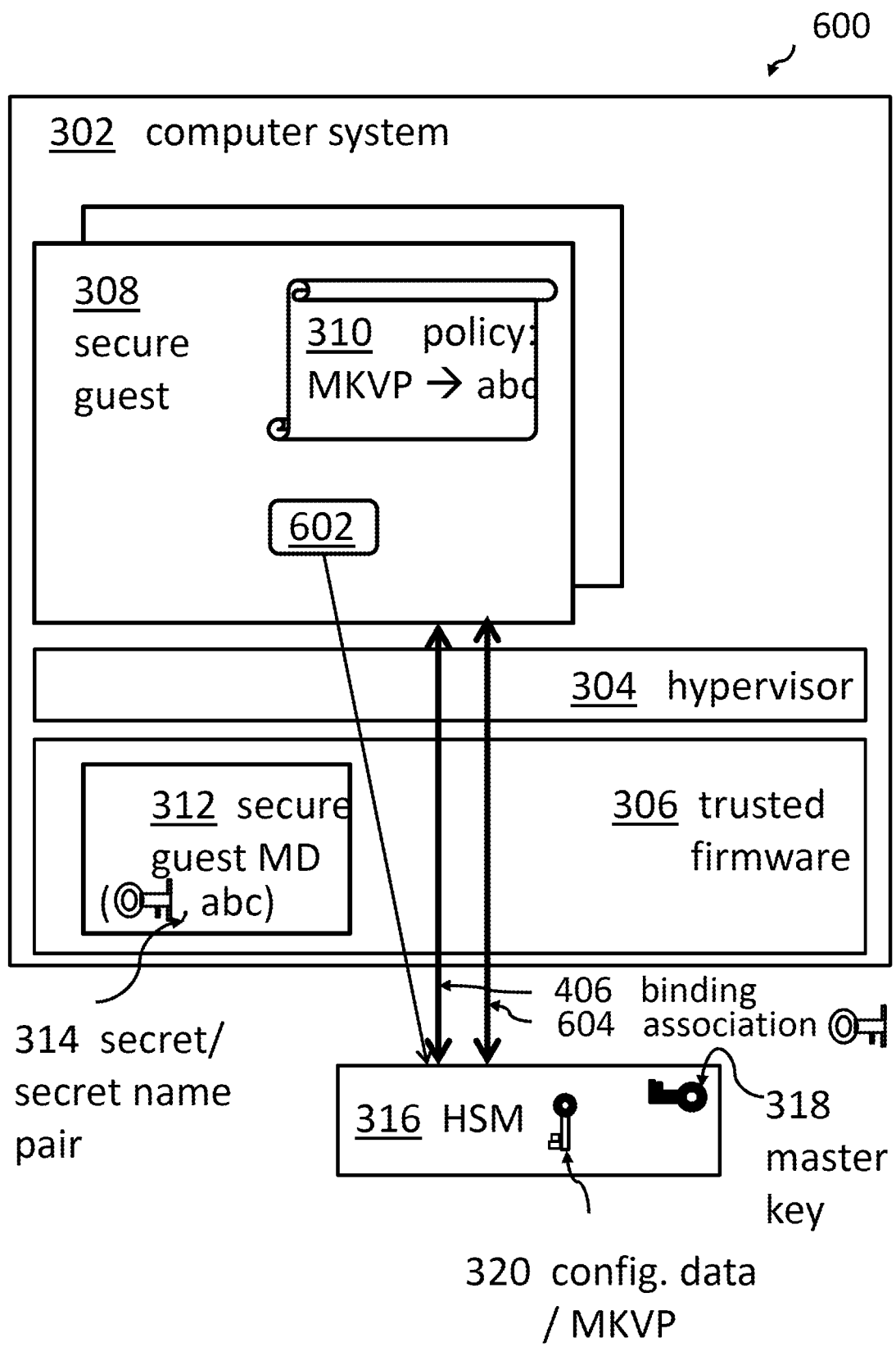

FIG. 6 shows a block diagram of a third step of the association of the HSM to the secure guest.

Figure 7:
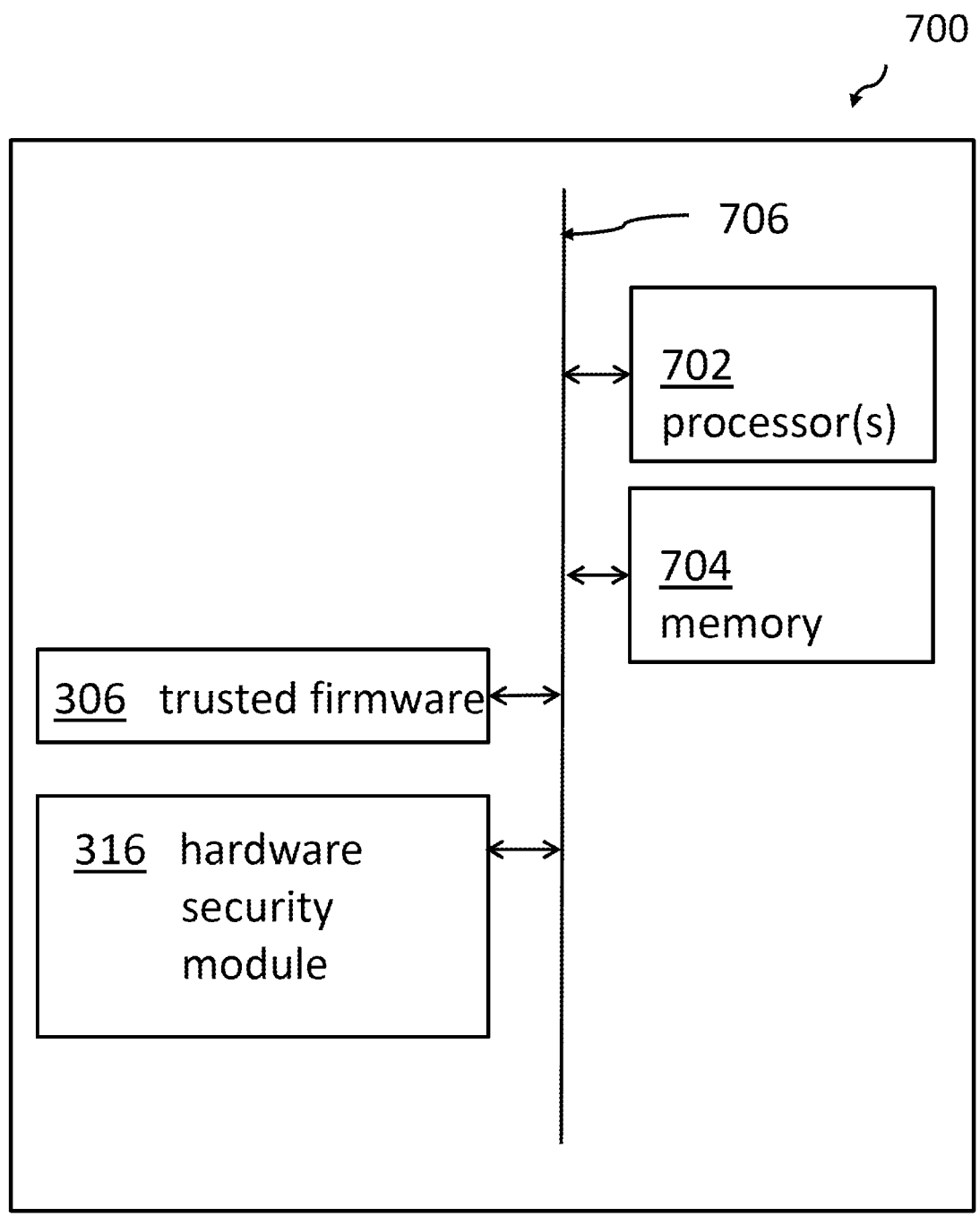

FIG. 7 shows a block diagram of an embodiment of the inventive security system for a policy-based association of a hardware security module to a secure guest in a confidential computing environment.

Figure 8:
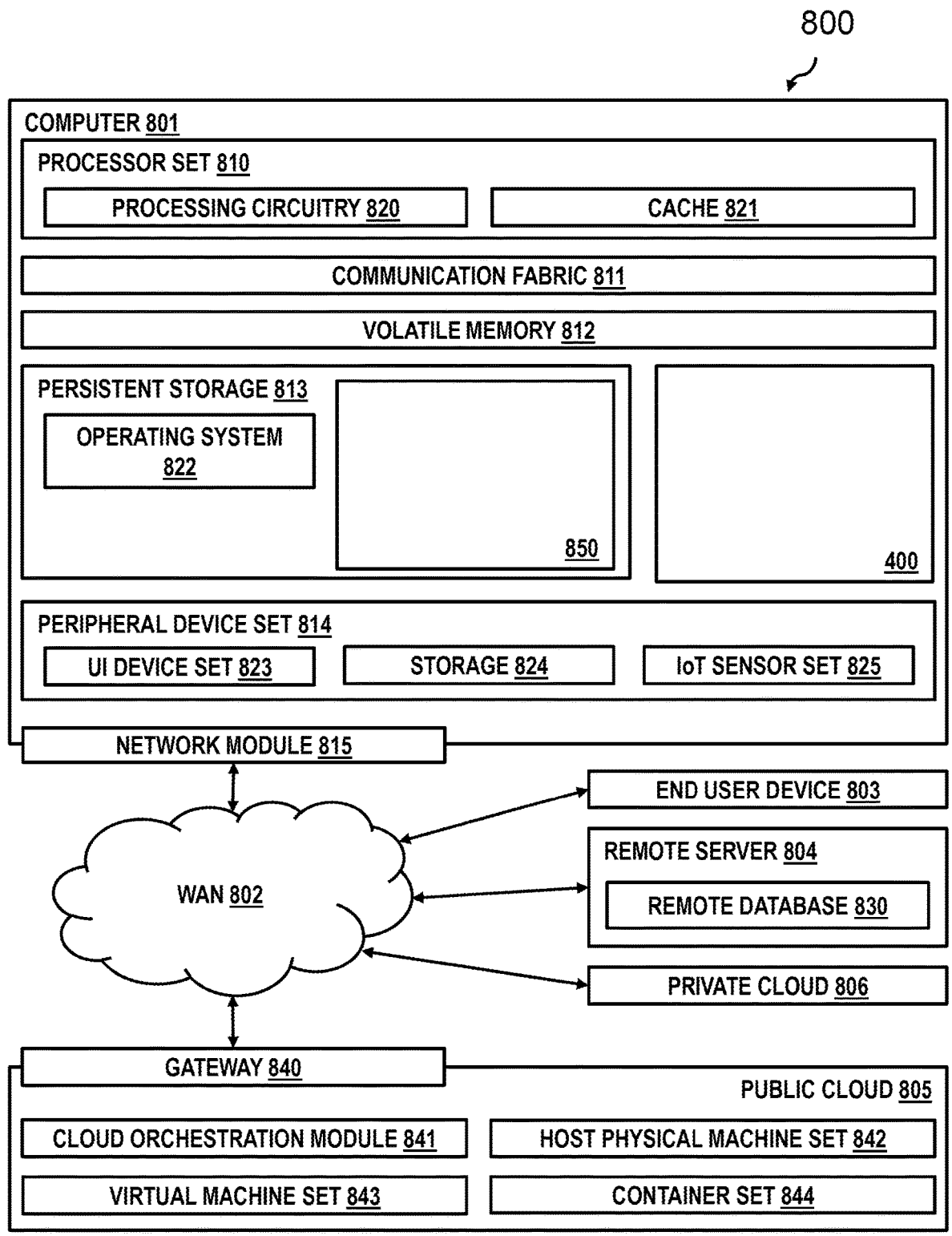

FIG. 8 shows an embodiment of a computing system comprising the system according to FIG. 7.

DETAILED DESCRIPTION

In the context of this description, the following technical conventions, terms and/or expressions may be used:

The term 'hardware security module' (HSM) may denote a hardware element being connected to or integrated into a computer system, e.g., a server system, e.g., here, a manufacturing-side server computer. The HSM is designed to be tamper proof, and to protect a secret, i.e., a software key against unauthorized access, even against physical penetration and/or unscheduled physical de-plugging. The HSM may be closely linked to a CPU or may be operated independently of the CPU. In other words, an HSM is a physical computing device that safeguards and manages one or more digital keys for strong authentication and provides crypto-processing. These modules traditionally may come in the form of a plug-in card or an external device that may be attached directly to a computer or network server.

The term 'secure guest' may denote a virtual machine or a software container comprising executable program code in a secure computing environment that is protected by a trusted execution environment such that no non-trusted component of a computer system can observe any state (memory or registers) of the running secure guest. It may be a generic guest image which may, e.g., be also provided by a third party, e.g., a software house. Typical non-trusted components are software hypervisors, hardware management consoles and other guests.

The term 'confidential computing environment' may denote a computing environment in which a hypervisor or any system management software having a user interface component may not access any plaintext contents or other state of a virtual machine.

The term 'binding' or 'binding a hardware security module to a secure guest' may denote that a linkage protected and controlled by the trusted firmware has been established between the secure guest and the bound hardware security module. The binding may establish a secure channel between the secure guest or the trusted firmware and the HSM may ensure integrity and confidentiality of the communication between the secure guest and the bound HSM. However, the binding may only allow non-sensitive, i.e., non-crypto requests from the bound secure guest to the HSM. In contrast, sensitive crypto requests from the secure guest to the HSM may only be allowed and controlled by the trusted firmware if an additional association between the secure guest and the HSM has been established.

The term 'association' or 'associate a secure guest to an HSM' may denote that—besides the binding between the secure guest and the HSM—a second relationship between the same secure guest in the same HSM—in particular the association between the two constituents—may have been established. The technical foundation for this may be the secret and the secret name and the sequence of steps described by the method. —Additionally, the association between the secure guest and the related HSM may be 'policy-based' in the sense that the secure guest may have access to a set of rules describing—among others—requirements to or configuration settings of an HSM which shall be associated to the secure guest.

The term 'non-sensitive request' may denote a request from a secure guest via the trusted firmware to an HSM allowing only non-cryptographic requests to an HSM, e.g., requests for configuration data. In contrast, the term 'sensitive request' or 'sensitive crypto-request' may denote a request to an HSM comprising encryption or decryption commands. In particular, requests that use or return HSM protected keys may be sensitive.

The term 'trusted firmware' (trusted FW or TFW) may denote a component deeply embedded into the hardware of the computing (mainframe) system which may not be accessed by any other user controlled software. The trusted firmware may have predefined and highly secured application programming interfaces in order to protect—in a broad sense—the functioning of the trusted firmware. The trusted FW should more be seen as a deeply integrated component of the computer system instead of a service component. Communication channels to/from the trusted firmware are typically cryptographically protected.

The term 'metadata' may denote—in the classical sense, information about data—here, in particular, data required to start a virtual machine. In a confidential computing environment, such information may be used by the trusted firmware in order to start a secure virtual machine, like, e.g., may contain integrity measures of an image of a secure guest or keys needed to decrypt the image of a secure guest. These metadata may, e.g., comprise resources required, interfaces required, performance required and—in some cases—also which security measures are appropriate. The extension of the metadata—e.g., in terms of the required binding information—but more specifically, in terms of the secret and secret name pair—to be used by the trusted firmware represents one of the foundations of the proposed concept.

The term 'pair of a secret and a secret name' may denote that the secret—potentially be used for the association between the secure guest and the HSM—may relate in a one-to-one manner to a secret name, e.g., an identifier of an HSM in order to build the basis for the association (i.e., not the binding to be established beforehand) between the secure guest and the HSM.

The term 'HSM configuration data' may denote a set of information describing abilities and settings of the related HSM. This may be codified in a dataset denoted as master key verification pattern (MKVP).

The term 'assignment configuration' may denote an aspect of the configuration of a system component or virtual server that may define that the component of a virtual server is granted visibility of and possibly basic access to a device like a HSM. For a standard guest, an assigned device may be detected and used by the guest. For a secure guest, an assigned device may be detected by the secure guest but it must be bound (and associated with a secret) to be used.

The term 'hypervisor' may denote a well-defined type of computer software or firmware that creates and runs virtual machines or software containers. Hence, a plurality of virtual machines/software containers may be executed in parallel without any risk of cross references. An error of the virtual machines may not cause any harm to another virtual machine. Each virtual machine may own a defined address room.

The term 'policy' may denote a description of an intended configuration typically stored in a file. A policy may establish a correspondence between an HSM specification and a secret. The definition of that correspondence may be indirect in nature. E.g., the secret may be referred to by secret name and the HSM specification may be referred to by HSM properties that can be queried like HSM configuration data including master key verification patterns.

In the following, a detailed description of the figures will be given. All instructions in the figures are schematic. Firstly, a block diagram of an embodiment of the inventive computer-implemented method for a policy-based association of a hardware security module to a secure guest in a confidential computing environment is given. Afterwards, further embodiments, as well as embodiments of the security system for a policy-based association of a hardware security module to a secure guest in a confidential computing environment will be described.

FIG. 1 shows a flowchart of a preferred embodiment of the computer-implemented method 100 for a policy-based association of a hardware security module to a secure guest in a confidential computing environment. The secure guest can be a virtual machine running on/in a hypervisor or a software container. The method comprises maintaining, 102—by a trusted firmware—a binding between a secure guest and an HSM. It should also be noted that there is no binding secret; only association secrets exist in the proposed concept. Hence, the binding enables the trusted guest to send only non-sensitive request to the HSM. A binding secret may—as an example—be sent at runtime of and by the secure guest to the trusted firmware for an extension of the secure guest's metadata in the trusted firmware. Alternative implementations comprise a binding setup during the start of the secure guest. Alternative implementations are also possible. However, a strict differentiation should be made between a binding of a secure guest to an HSM and an association of a secure guest to an HSM.

The method 100 comprises also maintaining, 104—by a trusted firmware—for a secure guest, a pair of a secret and a secret name. These may originate from the original metadata of the secure guest. The secret name can be an alphanumeric sequence—like a secret ID—and shall never be visible in plaintext or otherwise to the secure guest.

Additionally, the method 100 comprises submitting, 106—by the secure guest via the trusted firmware—a query to the bound HSM for obtaining HSM configuration data. This query is possible based on the binding between the secure guest and the HSM because it is a non-sensitive request, e.g., no HSM protected keys are involved. The configuration data can be available in form of, e.g., a master key verification pattern (MKVP).

Furthermore and upon determining, 108—by the secure guest—that the obtained HSM configuration data match a policy rule available to the secure guest, the method 100 also comprises requesting, 110—by the secure guest from the trusted firmware—to associate the secret from the pair of secret and the secret name to the bound HSM, thereby triggering that the trusted firmware allows the secure guest to submit a sensitive crypto-request to the bound and associated HSM. As a basis for this, the policy rule associates the HSM configuration data to a secret name.

FIG. 2 shows a block diagram 200 of security threats even when using trusted firmware and/or the security module. All components are preferably executed as part of the computer system 202. Very closely related to the computer system 202 as such is the trusted firmware 204 which cannot be changed by a user of the computer system and which is installed and enabled during the production of the computer system 202.

Additionally, one or more hardware security modules HSM-1 206*a*, HSM-i 206*b* can be components of the computer system 202. Here, e.g., an HSM master key (shown as black horizontal key) to be used to protect HSM protected keys may be stored and can only be accessed using clearly defined and strict access procedures.

A next layer of the stacked architecture is represented by the hypervisor 208 which enables an execution of secure (virtual) guests 210, 214, 215, e.g., virtual machines or software containers comprising executables of the code. Secure guest 210 can exemplary maintain a secure key 212 which may be protected by the master key managed by one of the HSMs 206a, 206b. However, in a situation where the secure key 212 may be exposed so that the secure guest-2 214 may have access to it, i.e., by stealing, 216, that key, and where also an HSM binding to a specific HSM-1 206a is stolen, 218, the secret key 212 can be misused by secure guest-2 214, i.e., for the wrong guest image 214 (compare access threat 222)

Even the third factor 220 together with the association secret 222 may finally not stop such threats if the secure guest 210 knows the binding secret 218 (because it may have been provided such secret during the start of the secure guest 210 to the trusted firmware). However, the solution to this potential security threat is to never reveal the association secret to the secure guest but, instead, let the secure guest refer to the secret by a secret name (i.e., the identifier of the HSM), as discussed in the context of FIG. 3.

FIG. 3 shows a block diagram of an embodiment 300 of more practical details of the proposed method. Here, the computer system 302 comprises the trusted firmware 306 including secure guest metadata 312. On the computer system 302, a hypervisor 304 is operative to host one or more secure guests 308. Furthermore, an HSM 316 is available to and/or part of the computer system 302 comprising a master key 318, as well as configuration data 320, e.g., in the form of a master key verification pattern. The secure guest metadata 312 are linked to the secure guest 308 and the secure guest shall use the HSM 316; both relationships are indicated by related arrows. Noteworthy is also the pair 314 of a secret and a related secret name as part of the secure guest metadata 312, as well as, the policy 310 accessible by the secure guest 308.

FIG. 4 shows a block diagram 400 of a first step in the association of the HSM 316 with the secure guest 308. Reference numbers already used in FIG. 3 have the same nominal value. In this first step, the secure guest (indicated by the two arrows 404) sends a request 402 to the trusted firmware 306 to establish a binding 406 between the secure guest 308 and the HSM 316. This binding does only allow non-sensitive requests from the secure guest 308 to the HSM 316.

FIG. 5 shows a block diagram 500 of a second step in the association of the HSM 316 with the secure guest 308. One of the allowed non-sensitive requests from the secure guest 308 to the HSM 316 is a request 502 for the configuration data 320 of the HSM 316. This is returned to the secure guest 308 in form of the master key verification pattern 504. A comparison of the received master key verification pattern 504 with the set of rules—i.e., the policy 310—may indicate that the rule(s) are satisfied for the specific HSM 316, so that a relationship between the master key verification pattern 504 representing the HSM 316 and the secret name—here, "abc"—are satisfied. The trusted firmware 306 is instrumental in establishing this relationship because all requests to the HSM 316 are routed via the trusted firmware 306 and are intercepted to determine whether a sensitive or non-sensitive request is present.

FIG. 6 shows a block diagram 600 of a third (and last) step of association the HSM 316 with the secure guest 308. Based on the received master key verification pattern 504 in the previous step and based on this a request to or via the trusted firmware 306 to associate the HSM 316 with the secure guest 308, the association 604 is finally realized based on the secret of the pair 314 of the secret and the secret name. As a result, the HSM 316 is (i) bound to and (ii) associated with the secure guest 308 such that now sensitive requests—i.e., crypto requests—are allowed to be sent to the HSM 316. It should also be noted that the complete pair 314 of secret and secret name is at no time of this process visible to the secure guest 308. Hence, all conditions for confidential computing are fulfilled.

Summarizing the process steps described as the sequence of FIG. 4 to FIG. 6, one can state: Firstly, the secure guest requests from the trusted firmware to bind an HSM to the secure guest. Thereby the trusted firmware allows the secure guest to submit requests without HSM protected keys to the HSM. Secondly, the secure guest submits a query to the HSM to obtain HSM configuration data, i.e., a master key verification pattern. Optionally, the secure guest can request from the firmware to return secret names of secrets in the secure guest metadata.

Next, the secure guest searches policies for secret name returned by the previous request. Thereby, the master key verification pattern can be associated with a secret name and the policy. For the secret name associated with the master key verification pattern of the policy, the secure guest requests from the trusted firmware to associate the secret associated with the secret name and the metadata with the HSM of which the configuration data was retrieved. Based on this, the trusted firmware performs the association request. And finally, the trusted firmware intercepts any request to generate an HSM protected key and enforces that the HSM protected key can only be processed by an HSM that is associated with the secret.

FIG. 7 shows a block diagram of an embodiment of the security system 700 for a policy-based association of a hardware security module to a secure guest in a confidential computing environment. The system comprises a processor 702 and a memory 704 operationally coupled to the processor 702, wherein the memory 704 stores software program code, which, when executed by the processor 702, enables the processor 702 to maintain, using a trusted firmware 706, a binding between a secure guest and an HSM, where the binding enables the trusted guest to send only non-sensitive requests to the HSM 316 (compare the preceding figures).

The processor is also enabled to maintain, using a trusted firmware 306 (compare the preceding figures) as maintenance unit, for a secure guest, a pair of a secret and a secret name, and to submit, by the secure guest via the trusted firmware 306 as submitting unit, a query to the bound HSM 316 or obtaining HSM 708 configuration data.

Furthermore, the processor upon determining, by the secure guest, that the obtained HSM 316 configuration data match a policy rule available to the secure guest, where the policy rule associates the HSM 316 configuration data to a secret name, is enabled to request, by the secure guest from the trusted firmware 306, to associate the secret from the pair of secret and the secret name with the bound HSM 316. Thereby, the trusted firmware is enabled to allow the secure guest to submit a sensitive crypto-request to the bound and associated HSM 316.

It shall also be mentioned that all functional units, modules and functional blocks—in particular, the processor 702, the memory 704, the trusted firmware 306 and the HSM 316—may be communicatively coupled to each other for signal or message exchange in a selected 1:1 manner. Alternatively the functional units, modules and functional blocks can be linked to a system internal bus system 706 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 shows a computing environment 800 comprising an example of an environment for the execution of at least some of the computer code involved in performing the inventive methods, such as the computer-implemented method for a policy-based association of a hardware security module to a secure guest in a confidential computing environment, 850.

In addition to block 850, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 850, as identified above), peripheral device set 814 (including user interface (UI), device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 850 in persistent storage 813.

COMMUNICATION FABRIC 811 is the signal conduction paths that allow the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, the volatile memory is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and rewriting of data. Some familiar forms of persistent storage include magnetic disks and solid state storage devices. Operating system 822 may take several forms, such as various known proprietary operating systems or open source Portable Operating System Interface type operating systems that employ a kernel. The code included in block 850 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (e.g., embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 802 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

It should also be mentioned that the security system 700 for a policy-based association of a hardware security module to a secure guest in a confidential computing environment can be an operational sub-system of the computer 801 and may be attached to a computer-internal bus system.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept can be summarized by the following clauses:

1. A computer-implemented method for a policy-based association of a hardware security module (HSM) with a secure guest in a confidential computing environment, the method comprising:
   maintaining, by a trusted firmware, a binding between a secure guest and an HSM, wherein the binding enables the trusted guest to send only non-sensitive requests to the HSM;
   maintaining, by the trusted firmware, for a secure guest, a pair of a secret and a secret name;
   submitting, by the secure guest via the trusted firmware, a query to the bound HSM for obtaining HSM configuration data; and
   upon determining, by the secure guest, that the obtained HSM configuration data match a policy rule available to the secure guest, wherein the policy rule associates the HSM configuration data with a secret name, requesting, by the secure guest from the trusted firmware, to associate the secret from the pair of secret and the secret name with the bound HSM, thereby triggering that the trusted firmware allows the secure guest to submit a sensitive crypto-request to the bound and associated HSM.

2. The method according to claim 1, further comprising:
   intercepting, by the trusted firmware, each request from the secure guest to an HSM for generating an HSM-protected key; and
   enforcing, by the trusted firmware, that the generated HSM-protected key is only to be used with the HSM associated with the secret from the secure guest.

3. The method according to claim 1, wherein an HSM master key verification pattern is indicative of the configuration data of the HSM.

4. The method according to claim 1, wherein the pair of the secret and the secret name is added to the metadata which the trusted firmware maintains for the secure guest.

5. The method according to claim 1, further comprising:
   requesting, by the secure guest from the trusted firmware, a list of secret names of the pairs of secrets and secret names maintained by the trusted firmware for the secure guest.

6. The method according to claim 1, further comprising:
   if the obtained configuration data of the HSM do not match the policy rule, submitting, by the secure guest via the trusted firmware, a new query to another HSM for obtaining other configuration data.

7. The method according to claim 1, further comprising:
   upon a change of an assignment configuration of the HSM bound to a secure guest, dissolving the binding of the HSM to the secure guest and dissolving the association of the HSM with any secret if such an association exists.

8. The method according to claim 1, wherein the trusted firmware denies all requests from a secure guest to an HSM that is not bound to the secure guest.

9. The method according to claim 1, wherein the binding between the secure guest and the HSM is established by the trusted firmware upon a request from the secure guest to the trusted firmware to bind the HSM, when the HSM is assigned to the secure guest.

10. The method according to claim 1, wherein a plaintext value of the secret is inaccessible by the secure guest.

11. The method according to claim 1, where any request to the HSM bound to the secure guest is only allowed if issued by the secure guest or the trusted firmware on behalf of the secure guest.

12. The method according to claim 1, where any request from a secure guest to the HSM that comprises an HSM protected key is a sensitive request, or whose response comprises an HSM protected key.

13. A security system for a policy-based association of a HSM with a secure guest in a confidential computing environment, the security system comprising a processor and a memory operationally coupled to the processor, wherein the memory stores software program code, which, when executed by the processor, enables the processor to:
maintain, using a trusted firmware, a binding between a secure guest and an HSM, wherein the binding enables the trusted guest to send only non-sensitive requests to the HSM;
maintain, using the trusted firmware, for a secure guest, a pair of a secret and a secret name;
submit, by the secure guest via the trusted firmware, a query to the bound HSM for obtaining HSM configuration data; and
upon determining, by the secure guest, that the obtained HSM configuration data match a policy rule available to the secure guest, wherein the policy rule associates the HSM configuration data to a secret name, request, by the secure guest from the trusted firmware, to associate the secret from the pair of secret and the secret name with the bound HSM, thereby triggering that the trusted firmware allows the secure guest to submit a sensitive crypto-request to the bound and associated HSM.

14. The security system according to claim 13, wherein the processor is further enabled to:
intercept, using the trusted firmware, each request to an HSM for generating an HSM-protected key; and
enforce, by the trusted firmware, that the generated HSM-protected key is only to be used with the HSM associated with the secret from the secure guest.

15. The security system according to claim 13, wherein an HSM master key verification pattern is indicative of the configuration data of the HSM.

16. The security system according to claim 13, wherein the pair of the secret and the secret name is added to the metadata which the trusted firmware maintains for the secure guest.

17. The security system according to claim 13, wherein the processor is further enabled to:
request, using the secure guest from the trusted firmware, a list of secret names of the pairs of secrets and secret names maintained by the trusted firmware for the secure guest.

18. The security system according to claim 13, wherein the processor is further enabled to:
if the obtained configuration data of the HSM do not match the policy rule, submit, by the secure guest via the trusted firmware, a new query to another HSM for obtaining other configuration data.

19. The security system according to claim 13, wherein the processor is further enabled to:

upon a change of an assignment configuration of the HSM bound to a secure guest, dissolve the binding of the HSM to the secure guest and dissolve the association of the HSM with any secret if such an association exists.

20. The security system according to claim 13, wherein the processor is also enabled to deny, using the trusted firmware, all requests from a secure guest to an HSM that is not bound to the secure guest.

21. The security system according to claim 13, wherein the binding between the secure guest and the HSM is established by the trusted firmware upon a request from the secure guest to the trusted firmware to bind the HSM when if the HSM is assigned to the secure guest.

22. The security system according to claim 13, wherein a plaintext value of the secret is inaccessible by the secure guest.

23. The security system according to claim 13, where any request to the HSM bound to the secure guest is only allowed if issued by the secure guest or the trusted firmware on behalf of the secure guest.

24. The security system according to claim 13, where any request from a secure guest to the HSM that comprise an HSM-protected key is a sensitive request, or whose response comprises an HSM-protected key.

25. A computer program product for a policy-based association of an HSM with a secure guest in a confidential computing environment, the computer program product comprising a computer readable storage medium having program instructions embodied therewith, the program instructions being executable by one or more computing systems or controllers to cause the one or more computing systems to:
maintain, using a trusted firmware, a binding between a secure guest and an HSM, wherein the binding enables the trusted guest to send only non-sensitive requests to the HSM;
maintain, using the trusted firmware, for a secure guest, a pair of a secret and a secret name;
submit, by the secure guest via the trusted firmware, a query to the bound HSM or obtaining HSM configuration data; and
upon determining, by the secure guest, that the obtained HSM configuration data match a policy rule available to the secure guest, wherein the policy rule associates the HSM configuration data to a secret name, request, by the secure guest from the trusted firmware, to associate the secret from the pair of secret and the secret name with the bound HSM, thereby triggering that the trusted firmware allows the secure guest to submit a sensitive crypto-request to the bound and associated HSM.

What is claimed is:

1. A computer-implemented method for a policy-based association of a hardware security module (HSM) with a secure guest in a confidential computing environment, the method comprising:
maintaining, by a trusted firmware, a binding between the secure guest and an HSM, wherein the binding enables the secure guest to send only non-sensitive requests to the HSM;
maintaining, by the trusted firmware, for the secure guest, a pair of a secret and a secret name;
submitting, by the secure guest via the trusted firmware, a query to the bound HSM for obtaining HSM configuration data; and upon determining, by the secure guest, that the obtained HSM configuration data match a policy rule available to the secure guest, wherein the policy rule associates the HSM configuration data with the secret name, requesting, by the secure guest from the trusted firmware, to associate the secret from the pair of secret and the secret name with the bound HSM, thereby triggering that the trusted firmware allows the secure guest to submit a sensitive crypto-request to the bound and associated HSM.

2. The method according to claim 1, further comprising:
intercepting, by the trusted firmware, each request from the secure guest to an HSM for generating an HSM-protected key; and
enforcing, by the trusted firmware, that the generated HSM-protected key is only to be used with the HSM associated with the secret from the secure guest.

3. The method according to claim 1, wherein an HSM master key verification pattern is indicative of the configuration data of the HSM.

4. The method according to claim 1, wherein the pair of the secret and the secret name is added to the metadata which the trusted firmware maintains for the secure guest.

5. The method according to claim 1, further comprising:
requesting, by the secure guest from the trusted firmware, a list of secret names of the pairs of secrets and secret names maintained by the trusted firmware for the secure guest.

6. The method according to claim 1, further comprising:
if the obtained configuration data of the HSM do not match the policy rule, submitting, by the secure guest via the trusted firmware, a new query to another HSM for obtaining other configuration data.

7. The method according to claim 1, further comprising:
upon a change of an assignment configuration of the HSM bound to a secure guest, dissolving the binding of the HSM to the secure guest and dissolving the association of the HSM with any secret if such an association exists.

8. The method according to claim 1, wherein the trusted firmware denies all requests from a secure guest to an HSM that is not bound to the secure guest.

9. The method according to claim 1, wherein the binding between the secure guest and the HSM is established by the trusted firmware upon a request from the secure guest to the trusted firmware to bind the HSM, when the HSM is assigned to the secure guest.

10. The method according to claim 1, wherein a plaintext value of the secret is inaccessible by the secure guest.

11. The method according to claim 1, where any request to the HSM bound to the secure guest is only allowed if issued by the secure guest or the trusted firmware on behalf of the secure guest.

12. The method according to claim 1, where any request from a secure guest to the HSM that comprises an HSM protected key is a sensitive request, or whose response comprises an HSM protected key.

13. A security system for a policy-based association of a HSM with a secure guest in a confidential computing environment, the security system comprising a processor and a memory operationally coupled to the processor, wherein the memory stores software program code, which, when executed by the processor, enables the processor to:
maintain, using a trusted firmware, a binding between the secure guest and an HSM, wherein the binding enables the secure guest to send only non-sensitive requests to the HSM;
maintain, using the trusted firmware, for the secure guest, a pair of a secret and a secret name;
submit, by the secure guest via the trusted firmware, a query to the bound HSM for obtaining HSM configuration data; and
upon determining, by the secure guest, that the obtained HSM configuration data match a policy rule available to the secure guest, wherein the policy rule associates the HSM configuration data to the secret name, request, by the secure guest from the trusted firmware, to associate the secret from the pair of secret and the secret name with the bound HSM, thereby triggering that the trusted firmware allows the secure guest to submit a sensitive crypto-request to the bound and associated HSM.

14. The security system according to claim 13, wherein the processor is further enabled to:
intercept, using the trusted firmware, each request to an HSM for generating an HSM-protected key; and
enforce, by the trusted firmware, that the generated HSM-protected key is only to be used with the HSM associated with the secret from the secure guest.

15. The security system according to claim 13, wherein an HSM master key verification pattern is indicative of the configuration data of the HSM.

16. The security system according to claim 13, wherein the pair of the secret and the secret name is added to the metadata which the trusted firmware maintains for the secure guest.

17. The security system according to claim 13, wherein the processor is further enabled to:
request, using the secure guest from the trusted firmware, a list of secret names of the pairs of secrets and secret names maintained by the trusted firmware for the secure guest.

18. The security system according to claim 13, wherein the processor is further enabled to:
if the obtained configuration data of the HSM do not match the policy rule, submit, by the secure guest via the trusted firmware, a new query to another HSM for obtaining other configuration data.

19. The security system according to claim 13, wherein the processor is further enabled to:
upon a change of an assignment configuration of the HSM bound to a secure guest, dissolve the binding of the HSM to the secure guest and dissolve the association of the HSM with any secret if such an association exists.

20. The security system according to claim 13, wherein the processor is also enabled to
deny, using the trusted firmware, all requests from a secure guest to an HSM that is not bound to the secure guest.

21. The security system according to claim 13, wherein the binding between the secure guest and the HSM is established by the trusted firmware upon a request from the secure guest to the trusted firmware to bind the HSM when if the HSM is assigned to the secure guest.

22. The security system according to claim 13, wherein a plaintext value of the secret is inaccessible by the secure guest.

23. The security system according to claim 13, where any request to the HSM bound to the secure guest is only allowed if issued by the secure guest or the trusted firmware on behalf of the secure guest.

24. The security system according to claim 13, where any request from a secure guest to the HSM that comprise an HSM-protected key is a sensitive request, or whose response comprises an HSM-protected key.

25. A computer program product for a policy-based association of an HSM with a secure guest in a confidential computing environment, the computer program product comprising a computer readable storage medium having program instructions embodied therewith, the program instructions being executable by one or more computing systems or controllers to cause the one or more computing systems to:
   maintain, using a trusted firmware, a binding between the secure guest and an HSM, wherein the binding enables the secure guest to send only non-sensitive requests to the HSM;
   maintain, using the trusted firmware, for the secure guest, a pair of a secret and a secret name;
   submit, by the secure guest via the trusted firmware, a query to the bound HSM or obtaining HSM configuration data; and
upon determining, by the secure guest, that the obtained HSM configuration data match a policy rule available to the secure guest, wherein the policy rule associates the HSM configuration data to the secret name, request, by the secure guest from the trusted firmware, to associate the secret from the pair of secret and the secret name with the bound HSM, thereby triggering that the trusted firmware allows the secure guest to submit a sensitive crypto-request to the bound and associated HSM.

* * * * *